Patented Feb. 17, 1942

2,273,324

UNITED STATES PATENT OFFICE 2,273,324

ACCELERATOR OF VULCANIZATION

Paul C. Jones, Akron, Ohio, assignor to The B. F. Goodrich Company, New York, N. Y., a corporation of New York No Drawing. Application May 22, 1940,
Serial No. 336,579

10 Claims. (Cl. 260—785)

This invention relates to the art of rubber manufacture and has as its chief object to provide a new class of accelerators.

I have discovered that compounds having a structural formula containing the configuration

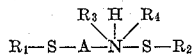

wherein $R_1$ and $R_2$ are organic radicals having a free valence on a carbon atom, $R_3$ and $R_4$ are members of the class consisting of hydrogen and hydrocarbon groups, and A is a lower alkylene group, are excellent accelerators of vulcanization. Since all of these compounds may be derived from sulfhydryl compounds, they will be grouped according to the sulfhydryls to which they are related.

When the accelerators are derived from the hydrocarbon mercaptans, $R_1$ and $R_2$ represent methyl, ethyl, isopropyl, allyl, cyclohexyl, benzyl, phenyl, talyl, naphthyl, xenyl, and the like groups.

In the members of this new class of accelerators which may be regarded as derived from carbothiolic and carbodithoic acids, $R_1$ and $R_2$ may represent methanecarbothionyl, acetyl, ethanecarbothionyl, benzenecarbothionyl, 3-furoyl, 3-furanecarbothionyl, etc.

In accelerators which may be considered as derived from dithiocarbamic acids, $R_1$ and $R_2$ represent dimethylthiocarbamyl, diethylthiocarbamyl, methyl-ethylthiocarbamyl, methyl-phenylthiocarbamyl, dicyclohexylthiocarbamyl, dibenzylthiocarbamyl, diphenylthiocarbamyl, phenyl-beta-naphthylthiocarbamyl, di-alpha-naphthylthiocarbamyl, etc.

The accelerators may be considered as being derived from azoles or azolines when $R_1$ and $R_2$ represent benzothiazyl, naphthothiazyl, 4,5-dimethylthiazyl, 4-phenylthiazyl, 4,5-dimethyloxazyl 4,4-diethylimidazyl, thiazolinyl, 4-methyl-5-ethylthiazolinyl, oxazolinyl, imidazolinyl, etc.

$R_3$ and $R_4$ may represent methyl, ethyl, isopropyl, cyclohexyl, benzyl, phenyl, tolyl, naphthyl, xenyl, etc.

$R_1$ and $R_2$ may represent the same groups or different groups, and $R_3$ and $R_4$ may likewise be the same or different.

A represents a lower alkylene group such as methylene, ethylene, propylene, butylene, propylidene, etc.

These compounds may be prepared by the addition reaction of sulfhydryl compounds and aminated esters of sulfhydryl compounds. Stoichiometric equations for the preparation of typical accelerators are as follows:

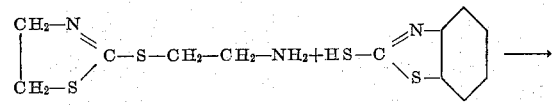

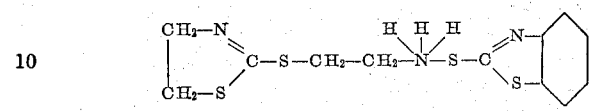

Thiazolinylthioethylammonium benzothiazyl sulfide

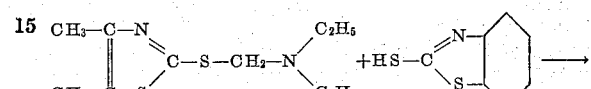

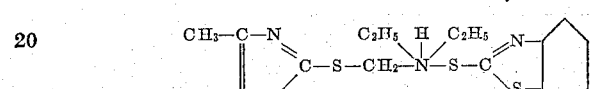

N-4,5-dimethylthiazylthiomethyl-N,N-diethylammonium benzothiazyl sulfide

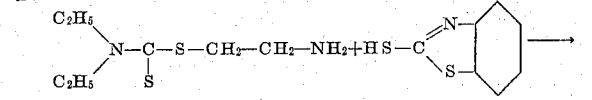

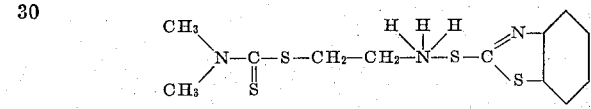

Dimethylthiocarbamylthioethylammonium benzothiazyl sulfide

Due to the instability of the free alkyl dithiocarbamic acids, it is desirable to prepare compounds in which $R_2$ represents an alkyl dithiocarbamyl group by the following reaction:

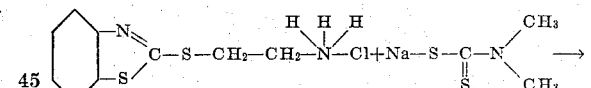

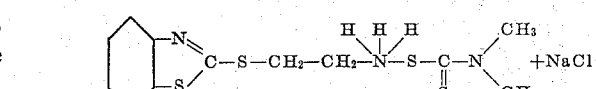

Benzothiazylthioethylammonium dimethylthiocarbamyl sulfide

The accelerators of this invention are exceedingly active materials, and do not require activation by fatty acid. As a specific example of their use in rubber, the following compositions were prepared:

|  | Composition | |
|---|---|---|
|  | 1 | 2 |
| Rubber | 100 | 100 |
| Sulfur | 3.5 | 3.5 |
| Zinc oxide | 5 | 5 |
| Thiazolinylthioethylammonium benzothiazyl sulfide | 1 | 0 |
| Thiazolinylthioethylammonium 4,5-dimethylthiazyl sulfide | 0 | 1 |

Composition 1 attained a tensile strength of 4050 lbs./in.$^2$ and an ultimate elongation of 730% when vulcanized in a heated mold for 15 min. at 287° F., while composition 2 attained a tensile strength of 4540 lbs./in.$^2$ and an ultimate elongation of 715% when vulcanized under the same conditions.

The accelerators of this invention may be preformed as in the specific examples, or the aminated ester and the sulfhydryl compound may be incorporated separately into the rubber and the substituted ammonium sulfide may be formed during vulcanization. Thus, instead of employing the accelerator of Example 1, equimolar proportions of the beta-aminoethyl ester of 2-mercaptothiazoline and 2-mercaptobenzothiazole may be incorporated into rubber prior to vulcanization with equivalent results.

It is to be understood that the specific examples given above are merely illustrative of one manner of the use of the accelerators of this invention; that other accelerators within the scope of the class herein defined may be substituted for the specific compounds used in the examples; that the accelerators of this invention may be used to vulcanize a rubber broadly, including caoutchouc and its analogues which are capable of vulcanization when heated with sulfur, such as balata, gutta-percha, synthetic rubber, or natural or artificially prepared latex; that the accelerators may be incorporated in the rubber by mastication or milling, or in the case of latex or other dispersion or solution, by simply dissolving or suspending the accelerator therein; that the accelerators may be used in admixture with each other or with other known accelerators or with antioxidants, organic acids, amines, softeners, activators, retarders, pigments, fillers, etc.; and that the rubber may be vulcanized with the assistance of this new class of accelerators in heated molds, hot air, steam, hot water, etc. The accelerators of this invention may advantageously be used in as low a proportion as 0.05% of the rubber in the composition, in which case 3 to 5% of sulfur is generally required, or as high as 5%, with a much reduced quantity of sulfur.

This invention is accordingly not limited to the specific examples herein set forth, for it will be obvious to those skilled in the art that many modifications such as using other materials having equivalent properties and varying the proportions of materials used are within the spirit and scope of the invention as defined in the appended claims.

I claim:

1. The method which comprises vulcanizing a rubber in the presence of a compound having the structural formula

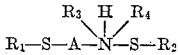

wherein $R_1$ and $R_2$ are organic radicals with the free valences on a carbon atom, $R_3$ and $R_4$ are members of the class consisting of hydrogen and hydrocarbon groups, and A is a lower alkylene group.

2. The method which comprises vulcanizing a rubber in the presence of a compound having the structural formula

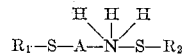

wherein $R_1$ and $R_2$ are organic radicals with the free valences on a carbon atom and A is a lower alkylene group.

3. The method which comprises vulcanizing a rubber in the presence of a compound having the structural formula

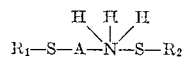

wherein $R_1$ is a thiazolinyl group, $R_2$ is a thiazyl group, and A is a lower alkylene group.

4. The method which comprises vulcanizing a rubber in the presence of thiazolinylthioethylammonium benzothiazyl sulfide.

5. The method which comprises vulcanizing a rubber in the presence of thiazolinylthioethylammonium 4,5-dimethylthiazyl sulfide.

6. A rubber composition comprising a rubber which has been vulcanized in the presence of a compound having the structural formula

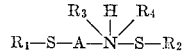

wherein $R_1$ and $R_2$ are organic radicals with the free valences on a carbon atom, $R_3$ and $R_4$ are members of the class consisting of hydrogen and hydrocarbon groups, and A is a lower alkylene group.

7. A rubber composition comprising a rubber which has been vulcanized in the presence of a compound having the structural formula

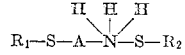

wherein $R_1$ and $R_2$ are organic radicals with the free valences on a carbon atom and A is a lower alkylene group.

8. A rubber composition comprising a rubber which has been vulcanized in the presence of a compound having the structural formula

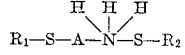

wherein $R_1$ is a thiazolinyl group, $R_2$ is a thiazyl group, and A is a lower alkylene group.

9. A rubber composition comprising a rubber which has been vulcanized in the presence of thiazolinylthioethylammonium benzothiazyl sulfide.

10. A rubber composition comprising a rubber which has been vulcanized in the presence of thiazolinylthioethylammonium 4,5-dimethylthiazyl sulfide.

PAUL C. JONES.